No. 879,361. PATENTED FEB. 18, 1908.
W. M. BRODIE.
BATTERY PLATE.
APPLICATION FILED FEB. 15, 1905.

Attest:
Edgeworth Greene
Delos Holden

Inventor:
William M. Brodie
by Frank L. Dyer
Atty.

UNITED STATES PATENT OFFICE.

WILLIAM M. BRODIE, OF WEST ORANGE, NEW JERSEY, ASSIGNOR TO EDISON MANUFACTURING COMPANY, OF WEST ORANGE, NEW JERSEY, A CORPORATION OF NEW JERSEY.

BATTERY-PLATE.

No. 879,361.  Specification of Letters Patent.  Patented Feb. 18, 1908.

Application filed February 15, 1905. Serial No. 245,652.

*To whom it may concern:*

Be it known that I, WILLIAM M. BRODIE, a citizen of the United States, residing in West Orange, Essex county, New Jersey, have invented certain new and useful Improvements in Battery-Plates, of which the following is a specification.

My invention relates to copper oxid plates for use in primary batteries and more particularly those of the Lalande type in which metallic zinc is employed in an alkaline solution, and consists in the features hereinafter described and claimed.

Figure 1:
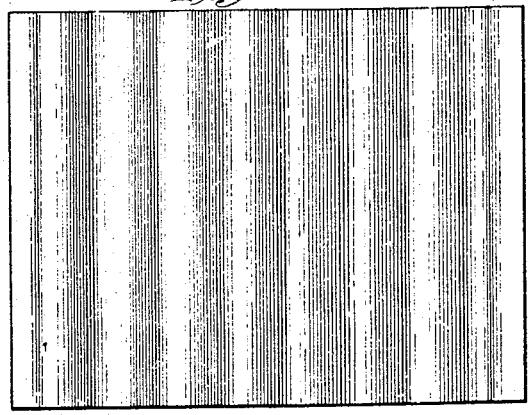
Figure 2:
Figure 3:
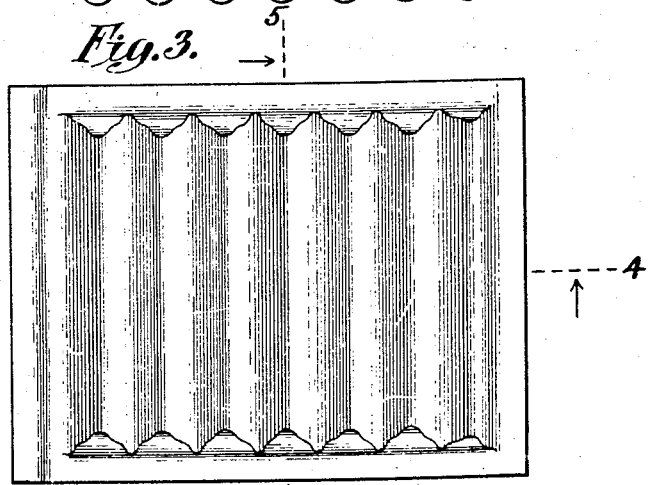
Figure 4:
Figure 5:

In the drawings which accompany this application, Figures 1 and 2 are side elevation and plan of one form of plate embodying my invention. Fig. 3 is a view similar to Fig. 1 of a modification. Fig. 4 is a section on the line 4—4 of Fig. 3, and, Fig. 5 is a section on the line 5—5 of Fig. 3.

In batteries of the type above referred to, the copper oxid plate undergoes chemical change during the operation of the battery, being reduced to metallic copper. As soon as the entire bulk of the plate or a large portion thereof has been reduced, the battery loses its efficiency, and it is necessary to renew the copper oxid plate. The current which can be obtained from such a cell depends largely upon the amount of surface presented by the copper oxid plate; that is, if we compare two cells in which the copper oxid plates are of the same weight but of different shapes, that cell in which the copper oxid plate has the greater surface will deliver the greater current—that is, it will have a higher discharge rate, though of course the copper oxid plate will become exhausted the sooner. It is very desirable to secure a high discharge rate, since this enables one to secure the same current from a smaller or more compact cell. In order to materially increase the surface of the plate as regards its mass, I endeavored to produce a copper oxid plate having deep corrugations formed therein. This material is, however, one whose particles have very slight attraction for each other, so that in forming battery plates, it is necessary to subject the material to enormous pressure. In this manner, it has been possible heretofore to produce plates whose surfaces are plane or practically so. In my endeavor to make a deeply corrugated plate of such material I encountered great difficulties, and in nearly every case the plate was either ruined during the process of manufacture—that is, while being removed from the dies—or else was possessed of so little strength after the baking operations as to be practically worthless, since it would break with ordinary handling. For instance, the entire series of corrugations would frequently be stripped from the body of the plate. However, after many experiments, I found that by forming the dies so that the tops or projecting portions of the corrugations of one die are opposite the depressions of the corrugations of the other die, and also by avoiding abrupt curves and making the corrugations well rounded, it is possible to produce in this manner a deeply corrugated plate of sufficient strength for practical use.

It is obvious that a plate of this form will contain more material within a given projected area than a plate having flat faces and the same effective thickness, and from this it results that if such plates be subjected to the same rate of discharge the corrugated plate will be of longer life than the flat plate.

I do not use a binder in making a plate of the material described, as my experience with binders has been unsatisfactory, the binders tending to either destroy, weaken, or chemically react upon the plates during the baking process to which they must be subjected. I have obtained excellent results by very slightly dampening the pulverulent copper oxid with a solution of caustic soda, which gives the same enough coherence to maintain its shape prior to and during the baking operation, which drives off the moisture and causes the copper oxid to become hard and coherent, so that it will resist ordinary handling as an article of commerce, this use of caustic soda and the baking operation being expedients well known in the art.

The plates invented by me may be in the forms shown in the drawing, wherein it will be observed that the characteristics specified as to the corrugations are present. I find in practice that the distance from one corrugation to another—that is, the distance from the top of one corrugation to the top of the one adjoining, may be one-half inch, while the distance from the highest point of a corrugation to the lowest point is three-sixteenths of an inch. In the form shown in Figs. 3, 4 and 5, the corrugations are below the surfaces of the upper and lower edges or margin of the plate.

Having now described my invention, I declare that what I claim is:

1. As a new article of manufacture, a strongly coherent, pressed copper oxid plate having corrugations formed therein of such depth as to materially increase the superficial area thereof, substantially as set forth.

2. As a new article of manufacture, a strongly coherent, pressed copper oxid plate having corrugations formed in both faces thereof of such depth as to materially increase the superficial area thereof, substantially as set forth.

3. As a new article of manufacture, a strongly coherent, pressed copper oxid plate having corrugations formed in both faces thereof of such depth as to materially increase the superficial area thereof, the elevations of one set of corrugations being directly opposite the depressions of the other set, substantially as set forth.

4. As a new article of manufacture, a strongly coherent, pressed copper oxid plate having corrugations formed therein of such depth as to materially increase the superficial area thereof, the tops and bottoms of said corrugations being well rounded, substantially as set forth.

5. As a new article of manufacture, a strongly coherent, pressed copper oxid plate having corrugations formed in both faces thereof of such depth as to materially increase the superficial area thereof, the tops and bottoms of said corrugations being well rounded and the elevations of one set of corrugations being directly opposite the depressions of the other set, substantially as set forth.

6. As a new article of manufacture, a strongly coherent, pressed copper oxid plate, having corrugations formed therein below the surfaces of its upper and lower edges, substantially as set forth.

7. As a new article of manufacture, a strongly coherent, pressed copper oxid plate having corrugations formed in both faces thereof below the surfaces of its upper and lower edges, substantially as set forth.

This specification signed and witnessed this 10th day of February, 1905.

WILLIAM M. BRODIE.

Witnesses:
FRANK L. DYER,
ANNA P. KLEHM.